(12) United States Patent
Baker

(10) Patent No.: US 8,857,369 B2
(45) Date of Patent: Oct. 14, 2014

(54) GAUGE

(75) Inventor: Mark James Baker, Grays (GB)

(73) Assignee: Visteon Global Technologies, Inc., Van Buren Township, MI (US)

( * ) Notice: Subject to any disclaimer, the term of this patent is extended or adjusted under 35 U.S.C. 154(b) by 797 days.

(21) Appl. No.: 13/025,196

(22) Filed: Feb. 11, 2011

(65) Prior Publication Data

US 2011/0203512 A1    Aug. 25, 2011

(30) Foreign Application Priority Data

Feb. 19, 2010   (GB) .................... 1002793.6

(51) Int. Cl.
*G01D 13/22*    (2006.01)
*G01F 23/00*    (2006.01)
*B60K 37/02*    (2006.01)

(52) U.S. Cl.
CPC ............... *B60K 37/02* (2013.01); *G01F 23/00* (2013.01); *G01D 13/22* (2013.01)
USPC .......................................... 116/284; 116/278

(58) Field of Classification Search
CPC ........ G01D 13/22; B60K 37/02; G01F 23/00; G04B 45/0038
USPC ......... 116/281–285, 28 R, 28.1, 278; 368/76, 368/223
See application file for complete search history.

(56) References Cited

U.S. PATENT DOCUMENTS

| | | | | |
|---|---|---|---|---|
| 1,478,384 A | * | 12/1923 | Dorsch .......................... 40/524 |
| 1,671,633 A | * | 5/1928 | Flegel et al. .................. 116/252 |
| 2,122,855 A | * | 7/1938 | Augustin et al. ................ 40/320 |
| 2,138,359 A | * | 11/1938 | Siepke .......................... 116/262 |
| 2,417,114 A | * | 3/1947 | Kilham ......................... 116/282 |
| 2,529,832 A | * | 11/1950 | Brietzke ....................... 116/278 |
| 2,529,833 A | * | 11/1950 | Brietzke ....................... 116/282 |
| 2,538,188 A | * | 1/1951 | Brietzke ....................... 116/282 |
| 2,578,965 A | * | 12/1951 | Blok ............................ 116/262 |
| 2,657,420 A | * | 11/1953 | Carbary ........................... 16/72 |
| 2,749,704 A | * | 6/1956 | Heikkila ....................... 368/233 |
| 3,139,854 A | * | 7/1964 | Hedges et al. ................ 116/278 |
| 3,530,820 A | * | 9/1970 | Morgenroth .................. 116/329 |
| 3,559,206 A | * | 1/1971 | Beecham ...................... 180/272 |
| 3,568,631 A | * | 3/1971 | Skinner ........................ 116/278 |
| 3,587,222 A | * | 6/1971 | Mestrovic ....................... 368/78 |

(Continued)

FOREIGN PATENT DOCUMENTS

DE    1548689 A1    11/1969
DE    3609605 A1    9/1987

(Continued)

*Primary Examiner* — R. A. Smith
*Assistant Examiner* — Tania Courson
(74) *Attorney, Agent, or Firm* — Fraser Clemens Martin & Miller LLC; J. Douglas Miller

(57) ABSTRACT

A pointer assembly includes a guide, a helical drive member supported in the guide, a motor for axially rotating the helical drive member, a follower carried by the helical drive member, and a pointer coupled to the follower and movable relative to the guide for indicating a measured value, wherein axial rotation of the helical drive member in a clockwise rotation causes the follower and the pointer to move in a first direction relative to the guide and axial rotation of the helical drive member in a counterclockwise rotation causes the follower and the pointer to move in a second direction relative to the guide.

20 Claims, 5 Drawing Sheets

(56) References Cited

U.S. PATENT DOCUMENTS

| | | | | |
|---|---|---|---|---|
| 3,739,741 | A * | 6/1973 | Freyermuth | 116/28.1 |
| 3,805,733 | A * | 4/1974 | Gilbert | 116/28.1 |
| 3,897,747 | A * | 8/1975 | Biazzo | 116/36 |
| 4,208,981 | A * | 6/1980 | Coha et al. | 116/28.1 |
| 4,788,881 | A * | 12/1988 | Owen et al. | 74/500.5 |
| 5,134,597 | A * | 7/1992 | Bradt | 368/223 |
| 5,201,277 | A * | 4/1993 | Aoki et al. | 116/286 |
| 6,082,288 | A * | 7/2000 | Kato et al. | 116/286 |
| 6,484,663 | B2 | 11/2002 | Zech et al. | |
| 6,490,992 | B2 * | 12/2002 | Olbrich et al. | 116/288 |
| 6,813,222 | B1 * | 11/2004 | De Salivet De Fouchecour | 368/77 |
| 7,082,890 | B2 * | 8/2006 | MacGregor et al. | 116/284 |
| 7,159,534 | B2 | 1/2007 | Tanaka et al. | |
| 7,347,160 | B2 | 3/2008 | Honma et al. | |
| 7,434,536 | B2 * | 10/2008 | Suess et al. | 116/298 |
| 7,520,241 | B2 * | 4/2009 | Pala et al. | 116/62.1 |
| 7,530,702 | B2 * | 5/2009 | Luettgen et al. | 362/23 |
| 7,573,255 | B2 * | 8/2009 | Totsuka | 324/146 |
| 7,703,410 | B2 * | 4/2010 | Fukuda et al. | 116/282 |
| 2002/0108554 | A1 | 8/2002 | Zech et al. | |
| 2007/0070819 | A1 * | 3/2007 | Choksi et al. | 368/76 |
| 2007/0194901 | A1 | 8/2007 | Ziegler et al. | |
| 2009/0056617 | A1 | 3/2009 | Forster | |
| 2009/0116212 | A1 | 5/2009 | Dietrich et al. | |
| 2011/0220009 | A1 * | 9/2011 | Betts et al. | 116/282 |
| 2011/0232563 | A1 * | 9/2011 | Ono et al. | 116/284 |
| 2011/0308445 | A1 * | 12/2011 | Avda | 116/201 |
| 2013/0055947 | A1 * | 3/2013 | Katsumata | 116/305 |

FOREIGN PATENT DOCUMENTS

| | | |
|---|---|---|
| DE | 10236693 A1 | 3/2003 |
| DE | 10325793 A1 | 12/2004 |
| DE | 102007006850 A1 | 8/2007 |
| DE | 102007041341 A1 | 3/2009 |
| FR | 2790552 A1 | 9/2000 |
| FR | 2945117 A1 | 11/2010 |
| GB | 1432111 A | 4/1976 |
| JP | 2000131099 A | 5/2000 |
| JP | 2005043287 | 2/2005 |
| JP | 2005091032 A | 4/2005 |
| JP | 2005106588 A | 4/2005 |
| JP | 2005134308 | 5/2005 |
| WO | WO2004068077 | 8/2004 |
| WO | 2007036474 A1 | 4/2007 |

* cited by examiner

GAUGE

CROSS-REFERENCE TO RELATED APPLICATION

The present application claims priority to United Kingdom Patent Application No. 1002793.6 filed Feb. 19, 2010, the entire disclosure of which is hereby incorporated herein by reference.

FIELD OF THE INVENTION

The present invention relates to a gauge and more particularly to an instrument gauge for a motor vehicle.

BACKGROUND OF THE INVENTION

Gauges with moving pointers have been known and used for many years. Some cluster gauge designs, for example speedometer or tachometer gauges in the dashboard of a motor vehicle, have a display located in a center of a gauge with a scale disposed around a periphery of the display. As a further example, the display can be used for fuel, computer, navigation, status warnings, safety features, telephone controls, and many other possible applications.

To avoid the pointer, or any supporting member for the pointer, overlying the display, a number of approaches have been devised for driving a pointer around the scale at the periphery of the gauge. U.S. Pat. No. 6,484,663 describes a ring gear and pinion drive arrangement. U.S. Pat. No. 7,159,534 discloses the use of a hook-shaped pointer with a motor mounted behind the display. A belt drive is used to move a display pointer in Japanese patent application JP 20050432787. It is known from International Pat. Appl. No. WO 20041068077 to form the image of a pointer on the display, and it is also known to reflect the image of a display in a lens in front of the gauge.

Prior art gauges and methods have various limitations, including the space needed to fit the mechanisms in or the visibility of imaged pointers in adverse lighting conditions. Typically, prior art gauges include scale designs that are limited to circular arcs.

It would be desirable to develop a gauge that minimizes a space requirement for the pointer and scale, while maximizing design option beyond circular shapes.

SUMMARY OF THE INVENTION

Concordant and consistent with the present invention, a gauge that minimizes a space requirement for the pointer and scale, while maximizing design option beyond circular shapes, has surprisingly been discovered.

The present invention includes a helical drive element which may be flexible and can be adapted to the form of a dial which may be circular or non-circular. The present invention provides designers considerable freedom in determining a shape of the dial or gauge.

In one embodiment, a pointer assembly comprises: a guide; a helical drive member supported in the guide; a motor for axially rotating the helical drive member; a follower carried by the helical drive member; and a pointer coupled to the follower and movable relative to the guide for indicating a measured value, wherein axial rotation of the helical drive member in a clockwise rotation causes the follower and the pointer to move in a first direction relative to the guide and axial rotation of the helical drive member in a counterclockwise rotation causes the follower and the pointer to move in a second direction relative to the guide.

In another embodiment, a gauge for indicating a measured value, the gauge includes a dial with an outer periphery, a scale disposed adjacent the outer periphery, and a pointer assembly comprising: a guide disposed adjacent the scale; a helical drive member supported in the guide; a motor for axially rotating the helical drive member; a follower carried by the helical drive member; and a pointer coupled to the follower and movable relative to the guide for indicating a measured value, wherein axial rotation of the helical drive member in a clockwise rotation causes the follower and the pointer to move in a first direction relative to the guide and axial rotation of the helical drive member in a counterclockwise rotation causes the follower and the pointer to move in a second direction relative to the guide.

The invention also provides methods of controlling a motion of a pointer.

One method comprises the steps of: providing a guide; disposing a helical drive member in the guide; arranging a follower to be carried by the helical drive member, the follower having a pointer coupled thereto; rotating the helical drive member, wherein axial rotation of the helical drive member in a clockwise rotation causes the follower and the pointer to move in a first direction relative to the guide and axial rotation of the helical drive member in a counterclockwise rotation causes the follower and the pointer to move in a second direction relative to the guide.

BRIEF DESCRIPTION OF THE DRAWINGS

The above, as well as other advantages of the present invention, will become readily apparent to those skilled in the art from the following detailed description of the preferred embodiment when considered in the light of the accompanying drawings in which.

DETAILED DESCRIPTION OF EXEMPLARY EMBODIMENTS OF THE INVENTION

The following detailed description and appended drawings describe and illustrate various embodiments of the invention. The description and drawings serve to enable one skilled in the art to make and use the invention, and are not intended to limit the scope of the invention in any manner. In respect of the methods disclosed, the steps presented are exemplary in nature, and thus, the order of the steps is not necessary or critical.

Figure 1:
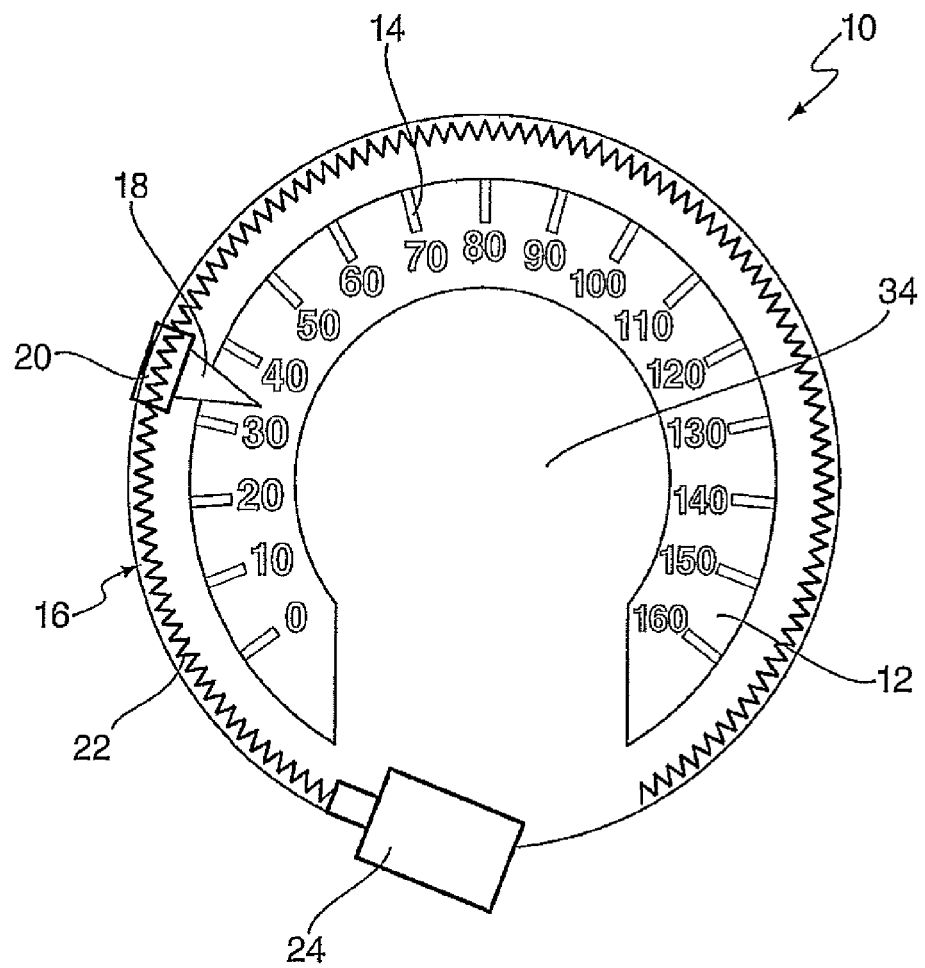
FIG. 1 is a schematic representation of a gauge according to an embodiment of the present invention.

FIG. 1 illustrates a gauge 10 suitable for use, for example, in a motor vehicle instrument panel. As shown, the gauge 10 includes a dial 12 extending in an arc around a portion of the face of the gauge 10, on which is a scale 14 including a plurality of display indicia. In the embodiment shown, the display indicia includes a series of scale marks and numbers. When used in a motor vehicle instrument panel, the scale 14 may display vehicle speed or engine speed or another measured operating parameter of the vehicle.

A pointer assembly 16 generally includes a guide 26, a helical drive member 22 supported in the guide 26, a motor 24 for axially rotating the helical drive member 22, a follower 20 carried by the helical drive member 22, and a pointer 18 operably connected to the follower 20.

As shown in FIG. 1, the pointer assembly 16 is disposed around an outer periphery of the gauge 10 and is provided to indicate values on the scale 14 of the dial 12. The pointer 18 is movable relative to the scale 14 for indicating measured values. In particular, a distal end of the pointer 18 overlies an outer periphery of the dial 12 and covers at least a part of the display indicia. In the embodiment shown, the pointer 18 has a generally triangular shape. However, the pointer 18 may be of any size and shape suitable for indicating values on the dial 12.

A base, or proximal end, of the pointer 18 is connected to the follower 20, the function of which is described below. Typically, the pointer 18 is connected to the follower 20 such that the pointer 18 does not move relative to the follower 20. In some embodiments the pointer 18 and follower 20 are integrally formed.

The follower 20 is engagable with the helical drive member 22. The helical drive member 22 has an axis that extends around the periphery of the gauge 10 so that a distance between the helical drive member 22 and the outer periphery of the dial 12 is uniform for the full length of the scale 14. In one embodiment, the helical drive member 22 includes a helical coil spring 22 formed from a suitable metal. The coil spring 22 has a uniform diameter along its length and a pitch of the helix is constant. The coil spring 22 is flexible so that the axis of the coil spring 22 is able to conform to the shape of the outer periphery of the gauge 10.

A drive shaft of the motor 24 is engaged with a first end of the helical drive member 22. As the drive shaft of the motor 24 rotates in a first direction, the helical drive member 22 rotates axially in the same direction. Axial rotation of the helical drive member 22 is reversed when the drive shaft of the motor 24 rotates in a second, opposite, direction.

The follower 20 engages the helical drive member 22 such that, as the helical drive member 22 rotates, the follower 20 moves along the length of the helical drive member 22. When the helical drive member 22 rotates in a first direction, the follower 20 moves along the length of the drive member 22 in one direction. When the helical drive member 22 rotates in a second direction, the follower 20 moves along the length of drive member 22 in the opposite direction. As a non-limiting example, a clockwise rotation of the drive member 22 causes the follower 20 and the pointer 18 to move in one direction relative to the scale 14 and a counterclockwise rotation causes the follower 20 and the pointer 18 to move in an opposite direction relative to the scale 14.

In certain embodiments, a further dial or other display may be located in the open centre 34 of the gauge 10.

In certain embodiments, the follower 20 includes a cylindrical member having a diameter slightly smaller than an inside diameter of the helical drive member 22. The follower 20 is therefore able to fit within a bore of the helical drive member 22, as shown in FIG. 2.

Figure 2:
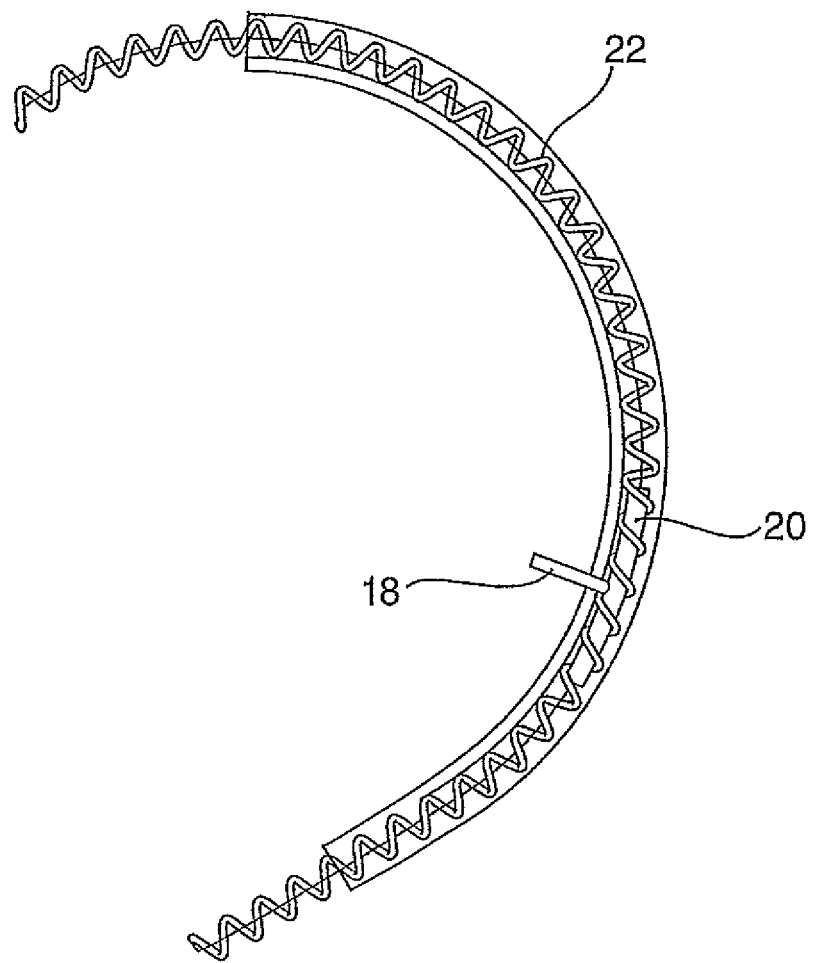
FIG. 2 is a front elevational view of a sub-assembly of a helical driver, a follower, and a pointer in accordance with another embodiment of the present invention.

In the embodiment shown in FIG. 2, the follower 20 is generally arcuate and is able to follow a curvature of the helical drive member 22 around the periphery of the dial 12. In other embodiments, the follower 20 may be flexible to allow the follower 20 to conform to different curvatures of the helical drive member 22.

The pointer 18 extends outwards from the follower 20 so that the pointer 18 passes between two turns of the helical member 22. In the embodiment shown in FIG. 2, the pointer 18 is substantially rectangular. As the helical drive member 22 rotates, the turns of the helical member 22 bear upon a part of the pointer 18 and cause movement of the follower 20 and pointer 18 along an axial length of the helical drive member 22. Driving the motor 24 therefore causes the pointer 18 to move around the dial 12 due to the axial rotation of the drive member 22.

Figure 3:
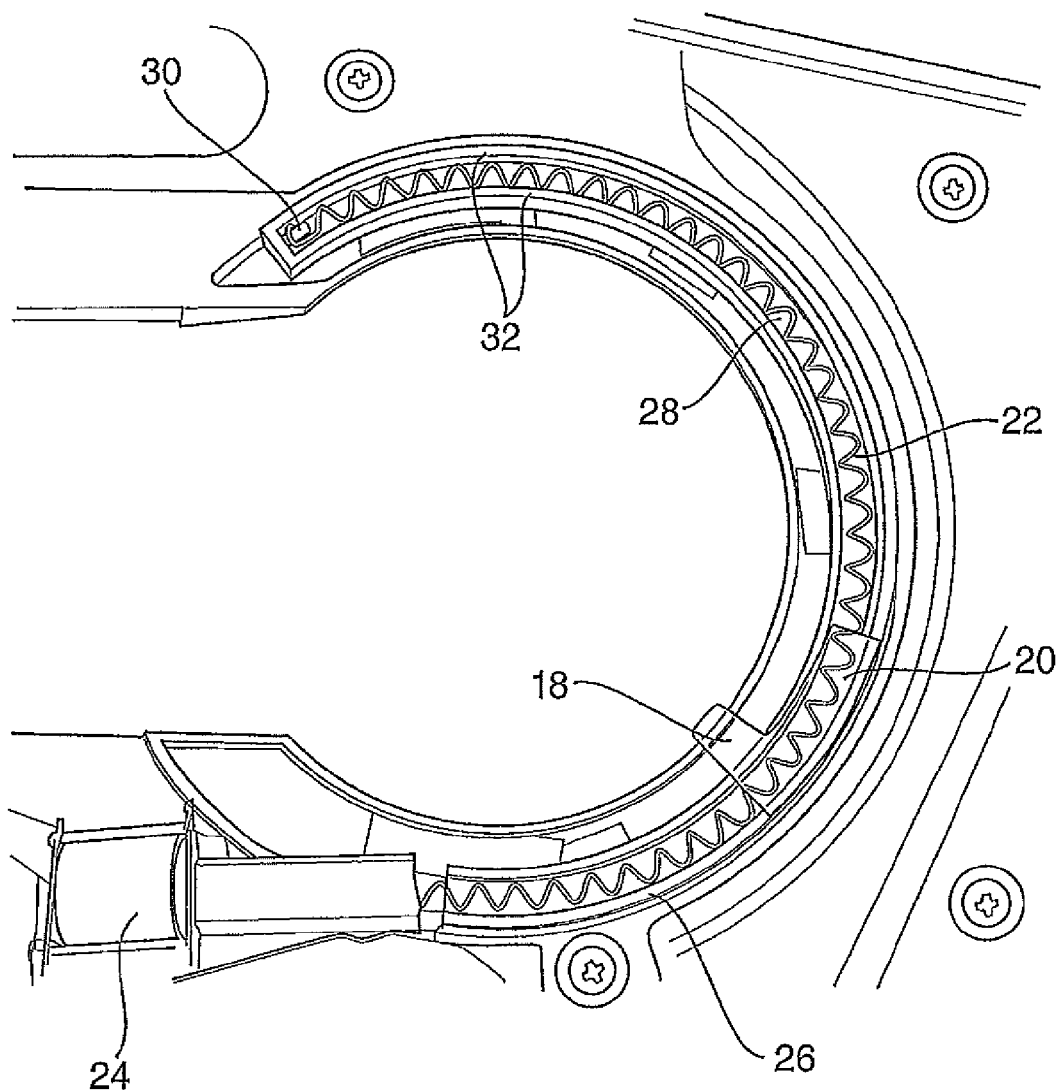
FIG. 3 is a fragmentary front elevational view of a pointer assembly including a helical driver in a guide, a follower and pointer, and a motor connected to one end of the helical driver in accordance with a further embodiment of the present invention.

To maintain the helical drive member 22 in a generally static position with respect to the dial 12, the drive member 22 is held within and supported by the guide 26, as shown in FIG. 3. As shown in FIG. 3, the guide 26 includes a generally U-shaped or C-shaped channel 28 having a width and a depth to accommodate the helical drive member 22. The guide 26 may be formed from any suitable material such as a plastic material, for example. The guide 26 may be rigid or flexible, as long as the guide 26 retains the helical drive member 22 in position around the periphery of the dial 12.

In the embodiment shown in FIG. 3, a second end of the helical drive member 22, at the opposite end to the motor 24, is held in position within the guide 26 by a peg 30. The peg 30 projects along the channel 28 from an end of the guide 26, and an internal diameter of the peg 30 is less than an internal diameter of the drive member 22 so that an end turn of the coil spring 22 is able to wrap around the peg 30 and be held in position at the end of the guide 26.

In the embodiment shown in FIG. 2, the follower 20 and pointer 18 have a single substantially L-shaped member. A longer arm of the L-shaped member is curved to match the curvature of the guide 26 and the drive member 22 and forms the follower 20. A shorter arm of the L-shaped member extends from an end of the concave edge of the follower 20 and forms the pointer 18. A width of the follower 20 is approximately equal to A width of the guide 26 so that the follower 20 rests on A top edge of each of the walls forming a plurality of sides 32 of the guide channel 28. A projection (not shown) extending from a rear face of the follower 20 passes between the turns of the helical drive member 22 and engages the drive member 22 to permit movement of the follower 20 and pointer 18 along the axial length of the drive member 22 as the drive member 22 rotates.

It is understood that the follower 20 and pointer 18 may be of any suitable design such that the follower 20 engages with the helical drive member 22 and the turns of the helical drive member 22 bear upon a part of the follower 20 and cause movement of the follower 20 and pointer 18 along the axial length of the helical drive member 22.

It is further understood that the helical drive member 22 may be formed of any suitable material and may be made from a thermoplastic material. In one embodiment, the helical drive member 22 is formed from a thermoplastic material and the design of the drive member 22 and the choice of material is such that the helical drive member 22 is sufficiently flexible to follow the curvature of a display dial 12.

In gauges 10 including dials 12 having a complex shape, the helical drive member 22 should be flexible enough to conform to the periphery of the dial 12 over the full length of the dial 12. In other embodiments, the dial 12 may be substantially straight so that the helical drive member 22 may be formed from a more rigid material.

Figure 4:
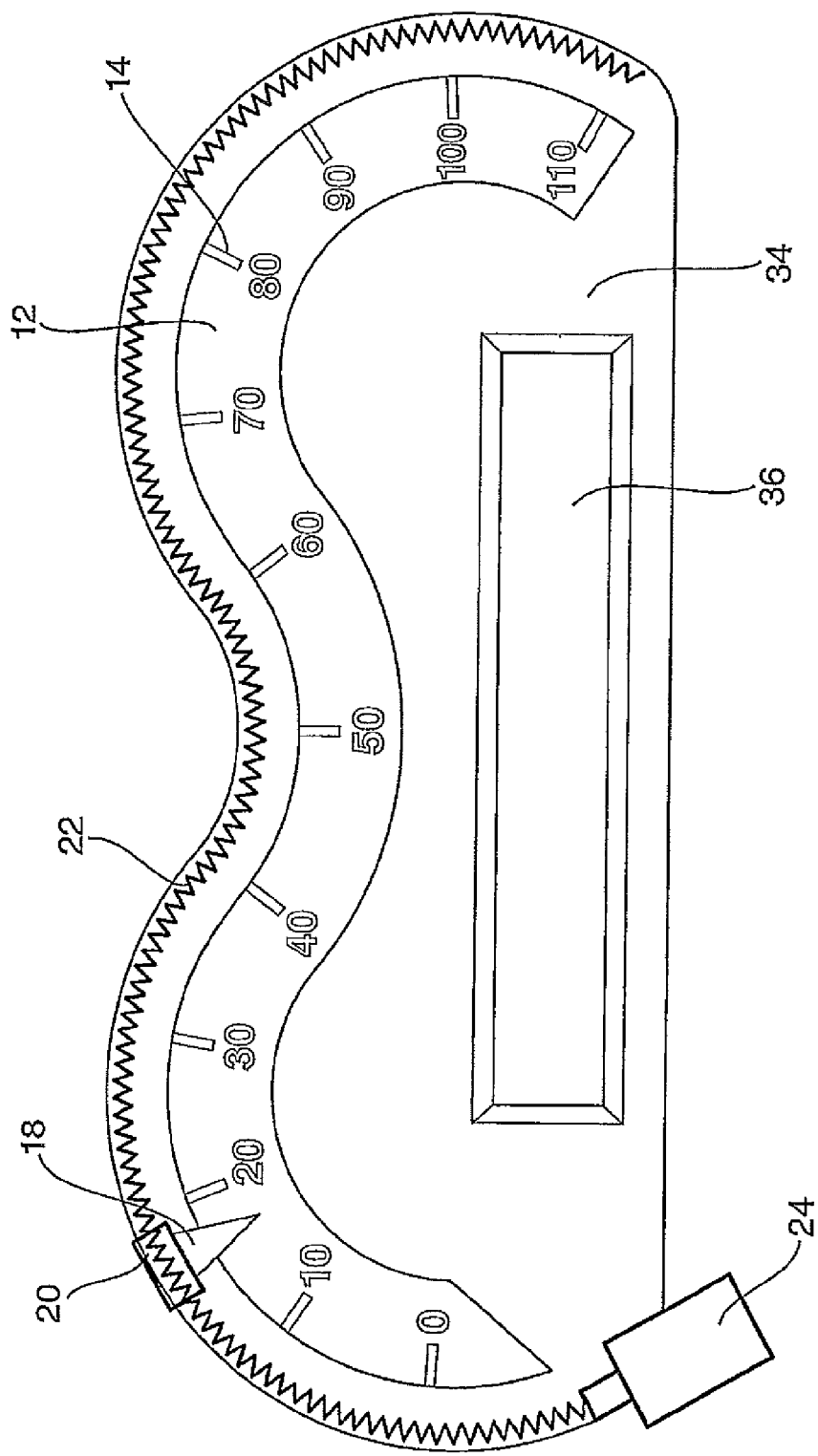
FIG. 4 is a front elevational view of a gauge having a non-circular scale in accordance with a further embodiment of the invention.

In the embodiment shown in FIG. 4, an outer periphery of the dial 12 is disposed in more than one arc. A more complex shape may provide a designer of instrument clusters greater design freedom in the arrangement of dials and displays in an instrument cluster.

The ability to contain the helical drive member within a guide located at the periphery of a gauge 10 or behind the arcuate face of a dial 12 means that the centre of the gauge 10 does not contain any drive mechanism. A display 36 may, therefore, be disposed within the dial 12 and preferably within the open centre 34 of the gauge 10. No part of the display 36 will be obscured in any part by any part of the pointer assembly 16 or scale 14, as shown in FIG. 4. This permits further gauges to be located within the first gauge 10 or, alternatively, allows an aperture to be formed in the centre 34 of the dial 12. The gauge 10 may then be arranged such that a liquid crystal display (LCD) or other display is viewable, by a driver of the vehicle, through the aperture.

Furthermore, in embodiments in which the helical drive member 22 is located behind the face of the dial 12, the area around the periphery of the dial 12 is also substantially free of any drive mechanism. It would therefore we possible to locate, for example, other dials around at least a part of the periphery of the gauge 10.

Figure 5:
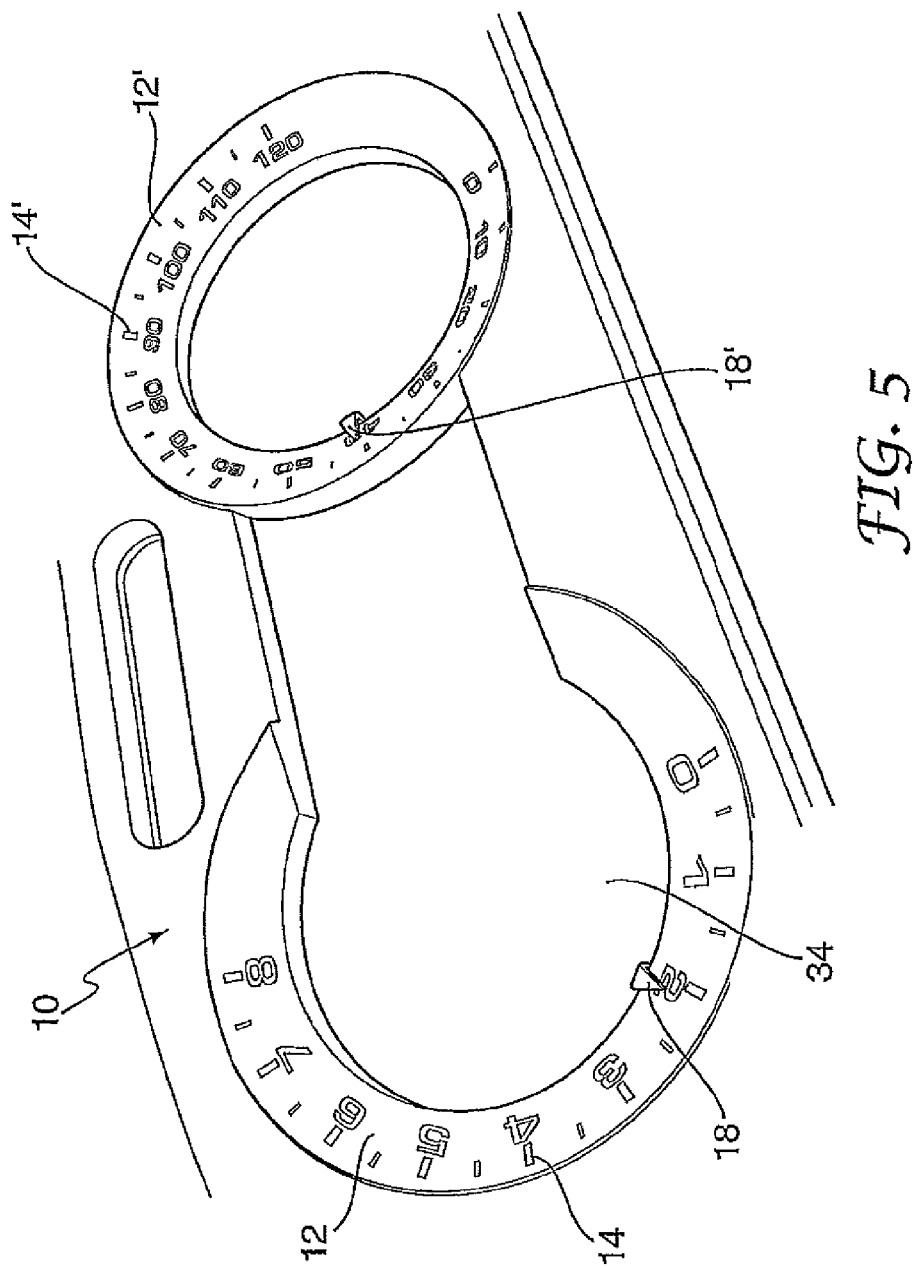
FIG. 5 is a perspective view of a portion of an instrument gauge cluster in accordance with a further embodiment of the invention.

FIG. 5 illustrates an embodiment of the present invention including two dials 12, 12'. As shown, the guide (not shown) and helical drive member (not shown) are positioned behind each of the dials 12, 12'. A first part of the pointer 18, 18' is then shaped to fit over an inner edge of the dial 12, 12', for example the first part of the pointer 18, 18' nearest the follower (not shown) may be substantially U-shaped. A second part of the pointer 18, 18', including the distal end of the pointer 18, 18', extends towards the outer edge of the dial 12, 12' and covers a part of the scale 14, 14'. The arrangement illustrated in FIG. 5 has the advantage that the drive member and guide do not take up any space either in the middle of the dials 12, 12' or around the outside of the dials 12, 12'.

Although the helical drive member 22 described hereinbefore has a constant pitch, it will be appreciated that a pointer assembly 16 may comprise a helical drive member 22 having a non-constant pitch. In these embodiments, in different regions of the helical drive member 22 having different pitches, the follower 20 moves different distances along the length of the helical drive member 22 for each rotation of the drive member 22. For example, the follower 20 will move a given distance along the length of the helical drive member 22 for each rotation of the drive member 22 in regions having a first pitch and a different distance along the length for each rotation in regions of the helical drive member 22 having a second pitch. This allows a gauge 10 to display a measured value with greater or lesser precision in different regions of the dial 12. For example, it may be desirable to show the amount of remaining fuel more precisely towards the lower end of the fuel gauge.

From the foregoing description, one ordinarily skilled in the art can easily ascertain the essential characteristics of this invention and, without departing from the spirit and scope thereof, make various changes and modifications to the invention to adapt it to various usages and conditions.

What is claimed is:
1. A pointer assembly comprising:
a guide;
a helical drive member supported in the guide;
a motor engaging one end of the helical drive member for axially rotating the helical drive member;
a follower carried by the helical drive member, wherein the follower is fitted within a bore of the helical drive member; and
a pointer coupled to the follower and movable relative to the guide for indicating a measured value, wherein axial rotation of the helical drive member in a clockwise rotation causes the follower and the pointer to move in a first direction relative to the guide and axial rotation of the helical drive member in a counterclockwise rotation causes the follower and the pointer to move in a second direction relative to the guide.

2. A pointer assembly according to claim 1, wherein the guide has an arcuate shape.

3. A pointer assembly according to claim 1, wherein the guide is configured in a plurality of arcs.

4. A pointer assembly according to claim 1, wherein an outer periphery of the guide is substantially straight.

5. A pointer assembly according to claim 1, wherein the helical drive member is substantially rigid.

6. A pointer assembly according to claim 1, wherein the helical drive member has a constant pitch such that the follower moves a given distance along a length of the helical drive member for each rotation of the drive member.

7. A pointer assembly according to claim 1, wherein the helical drive member has a non-constant pitch such that, in different regions of the helical drive member having different pitches, the follower moves different distances along a length of the helical drive member for each rotation of the drive member.

8. A pointer assembly according to claim 1, wherein the guide includes a generally U-shaped or C-shaped channel in which the helical drive member is supported.

9. A gauge for indicating a measured value, the gauge including a dial with an outer periphery, a scale disposed adjacent the outer periphery, and a pointer assembly comprising:
a guide disposed adjacent the scale;
a helical drive member supported in the guide;
a motor engaging one end of the helical drive member for axially rotating the helical drive member;
a follower carried by the helical drive member, wherein the follower is fitted within a bore of the helical drive member; and
a pointer coupled to the follower and movable relative to the guide for indicating a measured value, wherein axial rotation of the helical drive member in a clockwise rotation causes the follower and the pointer to move in a first direction relative to the guide and axial rotation of the helical drive member in a counterclockwise rotation causes the follower and the pointer to move in a second direction relative to the guide.

10. A gauge according to claim 9, wherein the outer periphery of the dial is disposed in a plurality of arcs.

11. A gauge according to claim 9, wherein the outer periphery of the scale is substantially straight.

12. A gauge according to claim 9, wherein the helical drive member is substantially rigid.

13. A gauge according to claim 9, wherein the helical drive member has a constant pitch such that the follower moves a given distance along the length of the helical drive member for each rotation of the drive member.

14. A gauge according to claim 9, wherein the helical drive member has a non-constant pitch such that, in different regions of the helical drive member having different pitches, the follower moves different distances along the length of the helical drive member for each rotation of the drive member.

15. A gauge according to claim 9, wherein the guide includes a generally U-shaped or C-shaped channel in which the helical drive member is supported.

16. A gauge according to claim 9, further comprising a display disposed within the dial.

17. A gauge according to claim 16, wherein no part of the display is obscured by any part of the scale or the pointer assembly.

18. A method of controlling a motion of a pointer, the method comprising the steps of:
- providing a guide;
- disposing a helical drive member in the guide;
- arranging a follower to be carried by the helical drive member, the follower having a pointer coupled thereto; and
- rotating the helical drive member, wherein axial rotation of the helical drive member in a clockwise rotation causes the follower and the pointer to move in a first direction relative to the guide and axial rotation of the helical drive member in a counterclockwise rotation causes the follower and the pointer to move in a second direction relative to the guide.

19. The method according to claim 18, wherein the helical drive member has a constant pitch such that the follower moves a given distance along the length of the helical drive member for each rotation of the drive member.

20. The method according to claim 18, wherein the helical drive member has a non-constant pitch such that, in different regions of the helical drive member having different pitches, the follower moves different distances along the length of the helical drive member for each rotation of the drive member.

* * * * *